INVENTORS
Carl Fritz Richter
Hermann H. Schill
BY ARTHUR A. MARCH
ATTORNEY

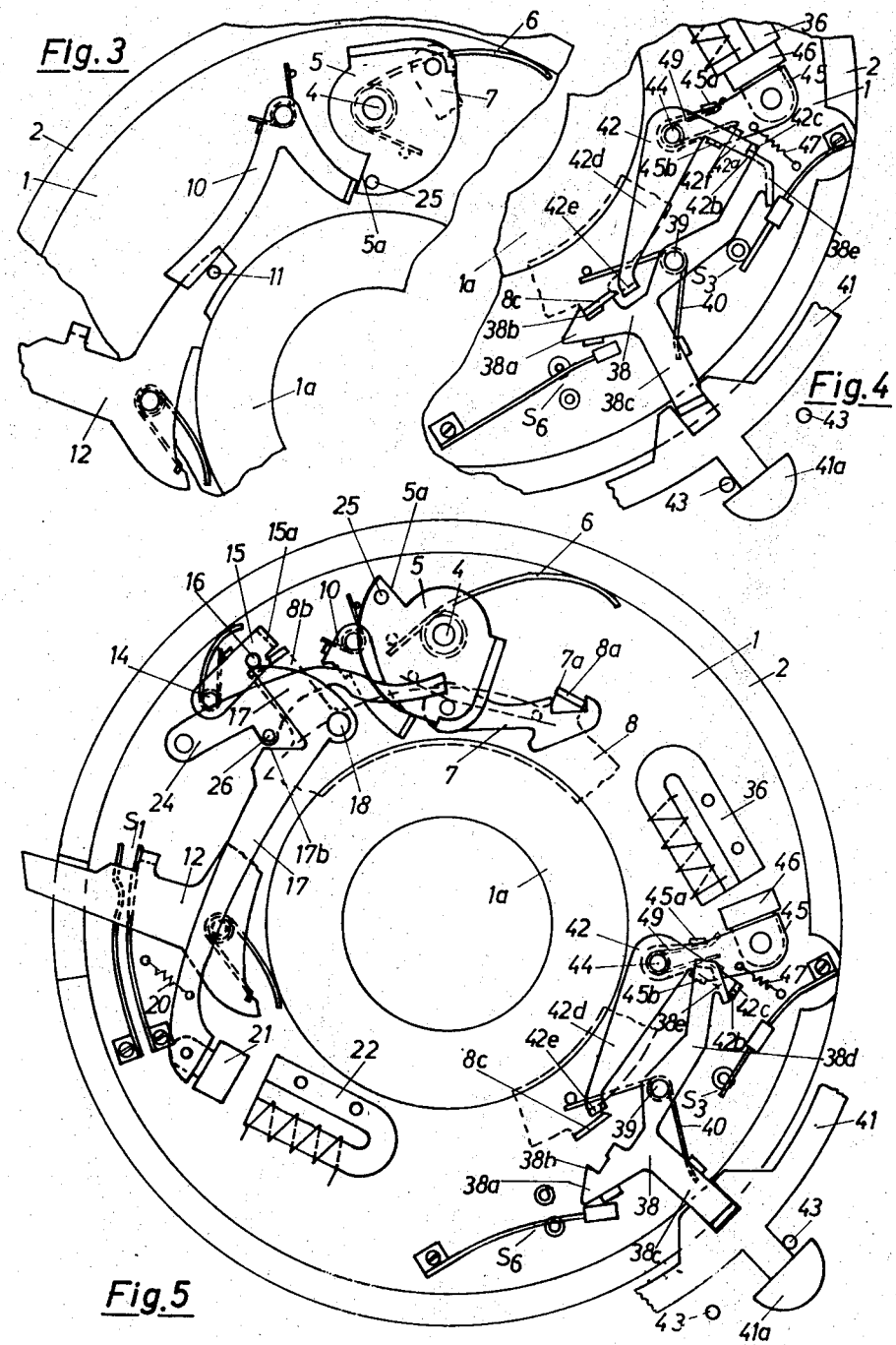

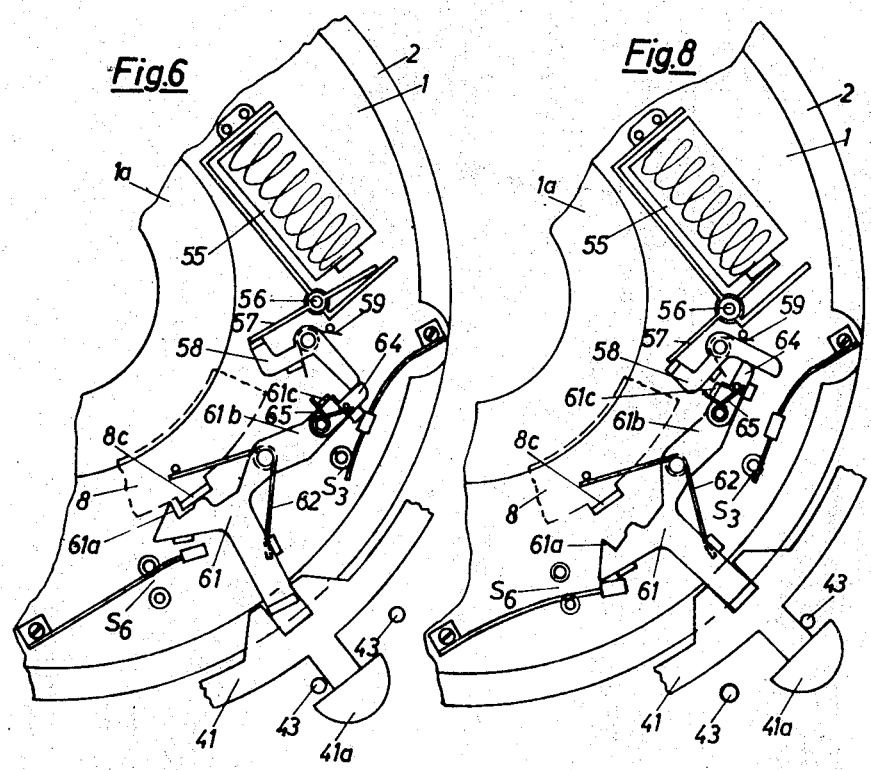
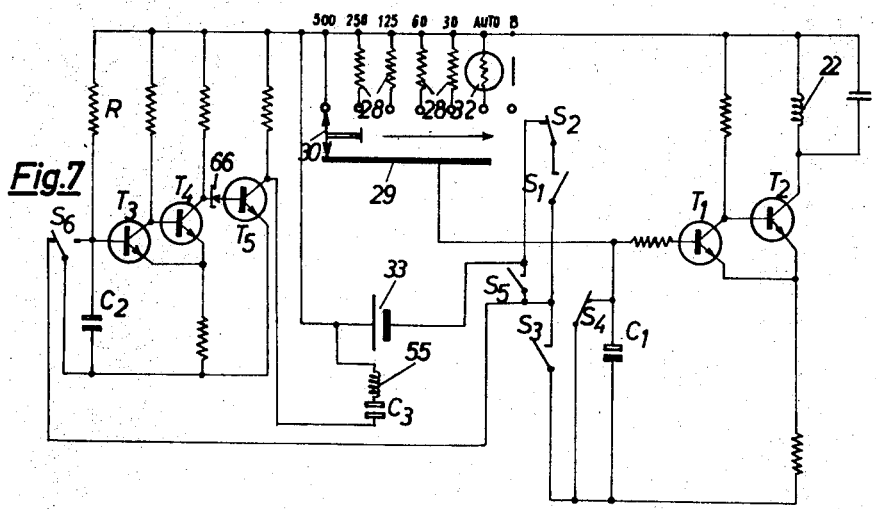

United States Patent Office 3,504,611
Patented Apr. 7, 1970

3,504,611
PHOTOGRAPHIC CAMERA WITH A DEVICE FOR THE ELECTRONIC CONTROL OF THE EXPOSURE TIME
Carl Fritz Richter and Hermann Heinz Schill, Calmbach, Black Forest, Germany, assignors to Prontor-Werk Alfred Gauthier G.m.b.H., Calmbach, Black Forest, Germany, a corporation of Germany
Filed June 2, 1967, Ser. No. 643,089
Claims priority, application Germany, June 4, 1966, P 39,617
Int. Cl. G03b 9/64, 9/62
U.S. Cl. 95—53.3                    12 Claims

ABSTRACT OF THE DISCLOSURE

A photographic camera with a shutter having an electronically controlled timing device and a lock operably connected to the timing device and influenceable thereby for locking the shutter in the open position. Further, an additional electronic circuit and a second locking device operably connected to the shutter and the additional electronic circuit are provided. The second locking device is controlled by the additional electronic circuit for retarding the opening motion of the shutter upon the release thereof for a certain time period.

---

The invention relates to a photographic camera having a shutter with an electronically controlled timing device by means of which a lock is influenceable to lock the shutter in open position.

To take pictures with automatic release with cameras of the above type, a mechanical movement built into the camera or into its shutter has been used which can be brought into the wound position either independently of the shutter or simultaneously therewith. These cameras have two time control devices based on completely different principles, namely a purely mechanical delaying system for self-timing exposures and a device working on electronic basis for the control of the exposure times.

It is an object of this invention to unify in an uncomplicated manner the systems for regulating the delaying period and exposure time in a camera with a device for electronically controlling the exposure time with relatively small structural expense whereby faultless functioning of the camera is guaranteed.

According to the invention, this object and other advantages are provided in a camera with electronic exposure time device, by an additional circuit, also working on electronic basis, and a locking device, controllable by the additional circuit to delay the opening motion of the released shutter for a certain period of time. This invention makes it possible to provide with relatively simple means a camera wherein not only the exposure time, as was common heretofore, but also the delay period can be controlled electronically for taking self-timing pictures. This invention results in a simplification of the camera design by virtue of the fact that both systems for the control of the delay period and of the exposure time work on an electronic basis.

To achieve a simple and uncomplicated design of the circuitry for the electronic control of the delay period and a perfect sequence of the functions of the various elements becoming effective after the release of the shutter by relay tripping, it is further provided according to the invention that the electronic circuit be designed as a trip circuit in parallel to the timing device and that it include an elecromagnet controllable by it, with which a locking lever is effectively associated which can engage the shutter blade actuating member against the force of a relay spring. The locking lever is lockable in this position and after the elapse of the delay period, the locking lever is released by the electromagnet and changes over into a position which enables the shutter to run off.

Another feature of the invention provides for the locking lever to be of multi-arm design for cooperation with a spring loaded support lever which is in transmissive connection with the armature of the electromagnet. The support lever secures the locking lever after its transfer into locking position and releases it after elapse of the delay period as a function of the state of the electromagnet. This measure allows for free design and configuration of the various components of the circuit for the control of the delay period, and also allows for various design possibilities for the mechanical and electronic parts of this arrangement.

For example, to arrive at a simple and economical design of the electronic component of the circuit for the control of the delay period, the electromagnet may be designed as a holding magnet which when energized, holds, by means of its armature, the support lever in a position securing the locking lever in locking position for the duration of the delay period. If it is desired to advantageously design the mechanical portion of the arrangement in particularly simple manner, the electromagnet may be designed as a pulling magnet that is supplied with current at the end of the delay period and by attracting the armature moves the support lever against the force of a positioning spring out of locking position with the locking lever.

For the further improvement of the invention for the purpose of making it function reliably and to avoid unnecessary capacity losses, another feature of the invention provides for two contact switches that are operable upon transfer of the locking lever into locking position, one of which puts the arrangement for the retardation of the opening motion of the shutter into operating readiness while the other one takes the electronic time forming device out of operation.

To make the use of the arrangement for the electronic control of the delay period independent of the camera or shutter design, it is further propsed according to the invention that the locking lever be connected to a winding ring equipped with a handle for manual operation.

Other objects and advantages will be readily apparent from the following detailed specification and the attached drawing wherein:

FIGURE 3 is a partial view of the camera of FIGURE 1 showing the release mechanism of the shutter arrangement.

FIGURE 4 is a partial view of the camera of FIGURE 1 showing the cooperation of sector ring and lock for the delay period after release of the shutter.

FIGURE 5 is a view similar to FIGURE 1 showing the position assumed by the shutter arrangement after the exposing process.

FIGURE 6 is a partial view of a camera with a shutter with another embodiment of a circuit for the electronic control of the delay period having an electromagnet designed as pulling magnet, whereby the delay period lock is transferred into locking position.

FIGURE 7 is a diagrammatic view of the electronic circuit for the arrangement of FIGURE 6 and the circuit of the electronic timing device.

FIGURE 8 is a view similar to FIGURE 6 after run-off.

Figure 1:
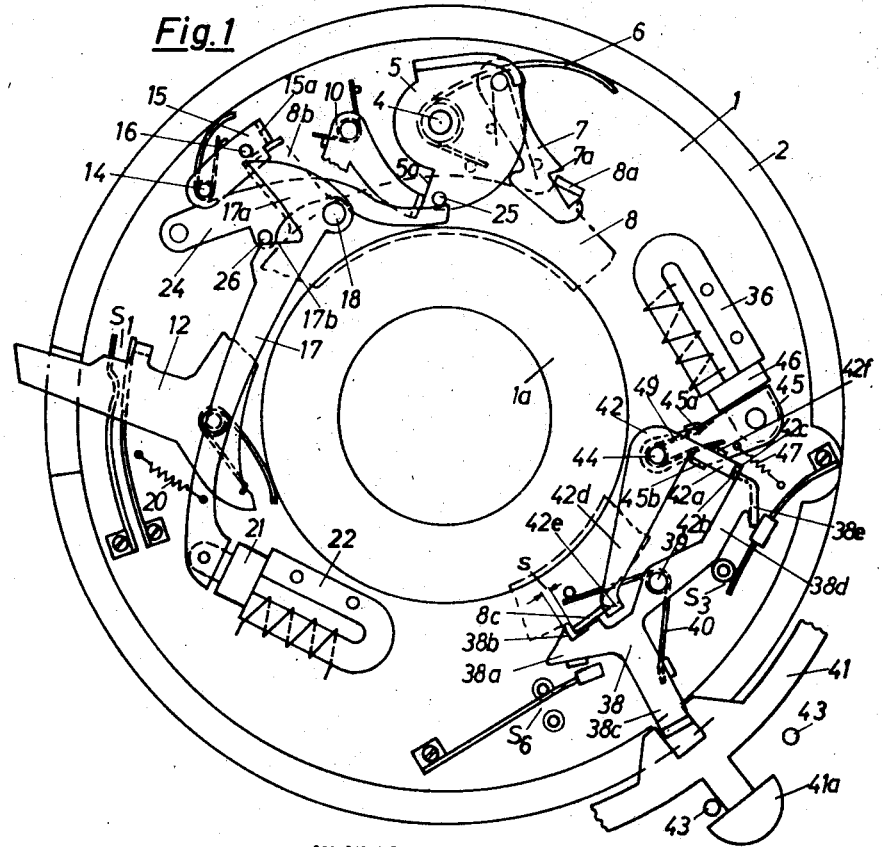
FIGURE 1 is a top view of the camera of this invention with the shutter transferred into the wound position and prepared for taking self-timing exposures, the shutter being equipped with electronically controlled locking devices for the delay period and the exposure time and, in addition, with a holding magnet to control the delay period.

Referring now to the drawings there is illustrated, a photographic shutter, exemplarily designed as a winding shutter having a base plate, designated by the reference numeral 1, disposed in a shutter housing 2 and provided with a nipple 1a. The base plate 1 serves to receive the shutter driving mechanism which can be designed as a crank drive. The shutter driving mechanism has a driving disk 5, mounted on a winding shaft 4 so as to corotate and biased by a drive spring 6. Linked to the disk 5 is a driving pawl 7 with a mouth 7a that engages a tab 8a of a sector ring 8, to give the sector irng 8 a back and forth rotary motion when the driving disk 5 runs off.

The driving disk 5 is arrested in its wound position, as illustrated in FIGURE 1, by means of a dual-armed release lever 10 which cooperates with a drive pin 11 on a pivoted actuating lever 12. The arrangement is such that the release lever 10 slides off an edge 5a of the driving disk 5, releasing it for run-off, when the actuating lever 12 is pivoted counterclockwise.

To enable pictures of different exposure times to be taken with the above described shutter arrangement, an electronically locking device is provided to lock the shutter driving mechanism in the open position of the sectors. The locking device has a catch lever 15, mounted on a pin 14, and having a tab 15a positioned in front of a shoulder 8b of the sector ring 8 in the open position of the shutter, thus blocking further motion of the sector ring 8 in accordance with the exposure time set. By means of a pin 16, the catch lever 15 cooperates with a cam 17a of an armature lever 17 rotatably mounted on a pin 18. The armature lever 17 is biased by a return spring 20 and carries an armature 21 at its long lever end. The armature 21 is made to contact an electromagnet 22, when winding the shutter, by providing a pushing lever 24 which is taken along by a pin 25 attached to the driving disk 5 so that a pin 26 on the pushing lever 24 hits an edge 17b of the armature lever 17 which, in turn, places the armature 21 against the electromagnet 22.

Figure 2:
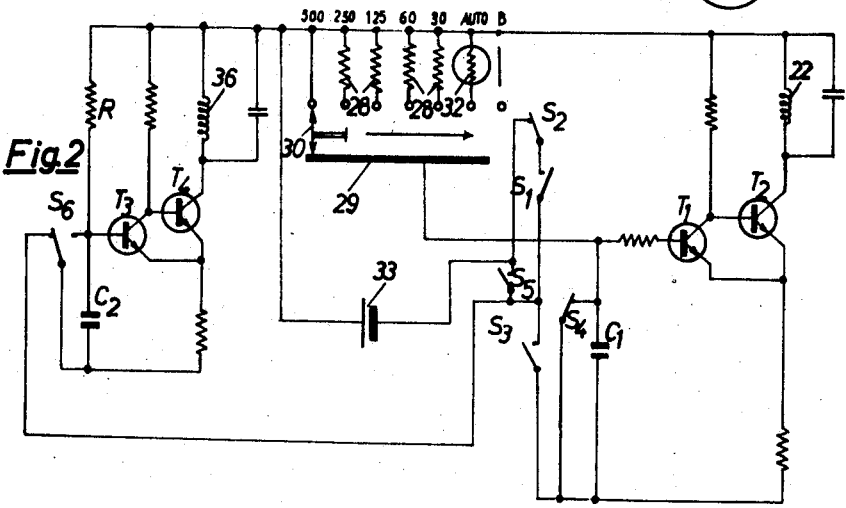
FIGURE 2 is a diagrammatic view of the two circuits for the control of the delay period and the exposure time.

As may be seen from FIG. 2, the electromagnet 22 is in an electronic circuit providing for the control of the exposure time and designed as trip circuit. Essential components of this trip circuit are two transistors $T_1$ and $T_2$ and a capacitor $C_1$ connected to the base of transistor $T_1$. To set various exposure times, a number of time regulating resistors 28 are provided, each one of which has a resistance value corresponding to a certain exposure time. By means of a contact bridge 30, movable by an exposure time setter (not shown), and contacting a slide path 29, one selected time regulating resistor 28 is included in the trip circuit. Besides the resistors 28, a photo resistor 32 can be provided in addition which, in the "AUTO" setting of the exposure time setter, is included in the electronic trip circuit by means of the contact bridge 30, permitting pictures to be taken with automatic exposure time setting controlled by lighting conditions.

A main switch $S_1$ that is closed upon release of the camera by means of the actuating lever 12, as illustrated in FIGURE 1, serves to connect the electronic trip circuit to a battery 33. Switches $S_2$ and $S_3$ are provided in series with the main switch $S_1$. Switch $S_2$ remains closed when taking pictures with exposure times controlled by the time regulating resistors 28 or the photo resistor 32 and is opened only, for instance by means of the exposure time setter, when taking B pictures. Switch $S_3$ is influenceable by a device, described hereinafter, for taking self-timing pictures. Also associated with the trip circuit are a charge starting contact $S_4$ and a switch $S_5$ in parallel to the main switch $S_1$, both of which can be actuated by the sector ring 8, for example. The charge starting contact $S_4$ short-circuits the capacitor $C_1$ in the normal position of the shutter and opens during the opening motion of the sector ring 8. In contrast thereto, the parallel switch $S_5$ is closed immediately when the sector ring 8 starts running, thus assuring the operation of the electronic trip circuit.

The above described shutter arrangement is further equipped with a device for taking self-timing pictures. This device also expediently comprises an electronically controlled circuit which cooperates with a locking device retarding the opening motion of the sector ring for a certain period. The circuit for the electronic control of the delay period can also be designed in simple manner as a trip circuit, representing a separate circuit parallel to the circuit for the electronic control of the exposure time. The trip circuit of the device shown in FIGURES 1 to 5 for the electronic control of the delay period has, as illustrated in FIGURE 2, two transistors $T_3$ and $T_4$, a capacitor $C_2$ and a resistor R suited for the delay period. In the collector circuit of the transistor $T_4$ there is an electromagnet 36 which acts as holding magnet and cooperates with a locking device described hereinafter, and thereby retards the opening motion of the sector ring 8. A reversing switch $S_6$, short-circuiting the capacitor $C_2$ in the initial position, serves to bring the circuit for the electronic control of the delay period into operating readiness.

As may be seen particularly in FIGURES 1, 4 and 5, the aforementioned locking device for providing the retardation of the opening motion of the sector ring 8 may have a three-armed locking lever 38 which is mounted on a pin 39 attached to the base plate 1 and biased by a relay spring 40. An arm 38a of the locking lever 38 has a locking edge 38b which can be positioned in front of a tab 8c of the sector ring 8, which tab 8c has a beveled upper edge. To actuate the locking lever 38, its arm 38c is engaged by a fitted connection to a winding ring 41 which pivots around the shutter housing 2 and has a handle 41a. The rotary motion of the winding ring 41 is limited by stops 43.

The locking lever 38 has an arm 38d with a downwardly bent tab 38e that cooperates with a support lever 42 of dual-armed design mounted on a pin 44 fastened in the base plate 1. The free end of an arm 42a of the support lever 42 has an upwardly bent tab 42b which has a laterally beveled upper edge 42c. The other arm 42d of the support lever 42 also has a downwardly bent tab 42e which positions itself in front of the tab 8c of the sector ring 8 when the locking lever 38 is transferred into the locking position illustrated in FIGURE 1.

To hold the lever 42 in the supporting position after the release of the shutter, an armature lever 45 is provided which is under the influence of a return spring 47 and carries an armature 46 cooperating with an electromagnet 36. To compensate for manufacturing and assembly tolerances, the support lever 42 and the armature lever 45 are positively connected with each other. For this purpose the armature lever 45 is mounted on the same shaft or pin 44 as the support lever 42. A coil spring 49 disposed on the bearing pin 44 supports itself at one end against a tab 45a of the armature lever 45 and at its other end against a tab 42f of the support lever 42 and thereby keeps the support lever 42 biased against another tab 45b of the armature lever 45.

In the range of motion of the two arms 38a and 38d of the locking lever 38, there are provided the two switches $S_6$ and $S_3$ mentioned earlier. The arrangement is such that when the locking lever 38 is transferred into the locking position illustrated in FIGURE 1, the reversing switch $S_6$ changes over from the short-circuiting position into the position illustrated in the diagram of FIGURE 2 in which an electrical connection of the trip circuit is establshed for the electronic control of the delay period with the switches $S_5$ and $S_1$. Immediately prior to reaching the locking position, the switch $S_3$ is opened by the arm 38d, thus assuring that the circuit for the electronic control of the exposure time stays interrupted from the battery 33 for the duration of the delay period so that unnecessary capacity losses of the battery are avoided.

The handling and operation of the shutter arrangement described above and illustrated in FIGURES 1 to 5 are as follows:

Initially, the shutter assumes the rest position shown in FIGURE 5, whereby the locking lever 38 keeps the reversing switch $S_6$ in the short-circuiting position not shown in FIGURE 2, whereas the switch $S_3$ assumes the contact making position. When winding the shutter driving mechanism, which expediently may occur simultaneously with transporting the film, the driving disk 5 is turned counterclockwise with reference to FIGURE 5 and is locked in the wound position illustrated in FIGURE 1 by the release lever 10. In the course of the winding motion, the armature 21 is caused to contact the electromagnet 22 by levers 24 and 17. The time regulating resistor 28 which corresponds to the desired exposure time or the photo resistor 32, respectively, is included into the circuit by means of the contact bridge 30 for the electronic control of the exposure time.

If it is desired that the released shutter open only after the elapse of a certain delay period, the winding ring 41 is now turned clockwise with reference to FIGURE 5 until it hits one of the limit stops 43. Due to the fitted connection, the locking lever 38 is taken along in the same rotary direction. Accordingly, the tab 38e of the locking lever 38 slides along the tab 42b of the support lever 42 and rotates it counterclockwise. The armature lever 45, being biased into connection with the support lever 42, participates in this motion against the force of the return spring 47.

At the end of the rotary motion of locking lever 38, the tab 38e leaves the tab 42b of the support lever 42 so that its arm 42a can position itself in front of the arm 38d of the locking lever. In so doing the edge 38b of the locking lever 38 has placed itself in the path of the tab 8c disposed on the sector ring 8. During the pivoting motion of the lever 42 into the supporting position, the tab 42e slides across the beveled tab 8c and snaps into place in front of it. This action thereby prevents the return spring 47 from turning the lever 42 back out of the supporting position so that the locking lever 38 is retained in the locking position after handle 41a has been released. Finally, when the locking lever 38 pivots into the locking position, it permits the switch $S_6$ to change over into the position shown in FIGURES 1 and 2 and causes the switch $S_3$ to open.

Immediately upon depressing the actuating lever 12, the electronic trip circuit for the control of the delay period is connected to battery 33 by the closing of the main switch $S_1$. This connection causes actuation of the transistor $T_4$ so that the electromagnet 36 builds up a magnetic field and holds the support lever 42 by magnetic force in the position securing the locking lever 38 in the locking position. At this time the transistor $T_3$ remains blocked. In the further course of the rotary motion of the actuating lever 12, the driving disk 5 is freed by the release lever 10. After traveling through the short distance indicated by the letter s in FIGURE 1, the tab 8c of the sector ring 8 leaves the support lever 42 and hits the edge 38b of the locking lever 38 as illustrated in FIGURE 4 thereby keeping the shutter closed for the duration of the delay period. When the ring 8 traverses the distance s the parallel switch $S_5$ is closed so that the circuit for the control of the delay period remains connected to the battery 33 even after the actuating lever 12 has been released.

After the elapse of the delay period, which may amount to, say, 8 to 10 seconds and depends on the resistance value of the resistor R as well as the capacity of the capacitor $C_2$, when the capacitor $C_2$ has reached the base voltage of the transistor $T_3$, it becomes active while the transistor $T_4$ blocks. Consequently, the electromagnet 36 becomes currentless, and the return spring 47 retracts the two levers 45 and 42 clockwise into the starting position. The locking lever 38 follows this motion under the influence of its relay spring 40 whereby, prior to the release of the sector ring 8, the switch $S_3$ changes over into contact making position, and in the further course of motion of the locking lever 38, the reversing switch $S_6$ is reversed. During the return motion, the arm 38d of locking lever 38 slides across the beveled edge 42c of the tab 42b and overtakes the lever arm 42a in order to snap in front of the tab 42b to assume its initial position as illustrated in FIGURE 5.

Due to the early closing of the contact switch $S_3$ during the return of locking lever 38, the electronic control of the exposure time is ready for operation even before the sector ring 8 has been freed by the locking lever. As early as the start of the clockwise rotation of the sector ring 8 into the open position, the electromagnet 22 is current-carrying and retains the armature lever 17 in the position shown in FIGURE 1. As soon as the sector ring 8 has reached the position corresponding to the open position of the sectors, the catch lever 15 drops in front of the shoulder 8b of the sector ring 8 and holds it for a certain period. In the locked position, the catch lever 15 supports itself with its pin 16 against the cam 17a of the armature lever 17. The charge starting contact $S_4$ has been separated during the opening motion of the sector ring 8 so that the capacitor $C_1$ begins charging. After a time interval commensurate with the set exposure time, the electromagnet 22 becomes currentless due to the transistor $T_1$ becoming active so that the spring 20 is enabled to retract the armature lever 17. In so doing, the catch lever 15 is lifted out of the locking position by the cam 17a and the pin 16 so that the sector ring 8 is enabled to continue its counterclockwise rotary motion under the influence of the driving disk 5 and to transfer the sectors into the closed position. At the end of the exposure run-off the shutter again resumes the position shown in FIGURE 5.

Another embodiment of this invention is illustrated in FIGURES 6–8 which in principle has the same design and operating mode as the embodiment illustrated in FIGURES 1–5 with the following variations.

A pulling magnet 55 is provided in place of the holding magnet 36 for the electronic control of the delay period for the purpose of arriving at a relatively simple design of the mechanical part of the device. The pulling magnet 55 cooperates, by means of an armature 57 of dual-armed design mounted on a pin 56, with a support lever 58 which is under the influence of a positioning spirng 59. The support lever 58 also cooperates with a multi-armed locking lever 61 which has a fitted connection to a winding ring 41 and an edge 61a which can be placed in the path of the tab 8c of the sector ring 8 against the force of a relay spring 62. The locking lever 61 can be secured in the locking position shown in FIGURE 6 by the support lever 58 by means of a bypass pawl 64 which is linked to an arm 61b of the locking lever 61 and which is held in the contact making position at a tab 61c by a spring 65 which is designed to be stiffer than the spring 62.

As illustrated in FIGURE 7, the electronic circuit serving the control of the pulling magnet 55 comprises, in addition to the two transistors $T_3$ and $T_4$, another transistor $T_5$ having a base connected to the collector of the transistor $T_4$ via a Zener diode 66. Assigned to the pulling magnet 55 connected to the positive terminal of battery 33 is a capacitor $C_3$ which is connected to the collector of the transistor $T_5$.

To take self-timing pictures with the device shown in FIGURES 6 to 8, the locking lever 61 is transferred into locking position by turning it with the winding ring 41 against the force of the relay spring 62 into the position illustrated in FIGURE 6. The support lever 58 follows this motion under the influence of the positioning spring 59, thereby turning the magnet armature 57 clockwise.

Thus, the locking lever 61 is secured in locking position in a simple manner by means of the lever 58 and the rotatable armature 57. When pivoting the locking lever 61 into locking position, the two switches $S_3$ and $S_6$ are actuated in the same manner as in the previously described embodiment.

With the release of the shutter, the main switch $S_1$ is closed, and the sector ring 8 again traverses the small distance indicated by the letter $s$ until its tab 8c strikes the edge 61a of the locking lever 61, thus prohibiting the opening motion from continuing. The parallel switch $S_5$ is closed during this small rotation of the sector ring 8. The consequence of making this contact is that transistor $T_4$ becomes active, whereas the two transistors $T_3$ and $T_5$ remain blocked for a time span depending on the resistor R and the capacitor $C_2$. Both sides of capacitor $C_3$ are thereby under positive potential so that no current can flow through the pulling magnet 55.

After the elapse of the delay period, the transistor $T_3$ becomes active, resulting in the blocking of the transistor $T_4$. This causes the voltage in front of the Zener diode to rise until the Zener voltage is exceeded, whereupon the transistor $T_5$ also becomes active. Consequently, one side of the capacitor $C_3$ receives negative potential so that it can charge. During the charging period a current flows through the pulling magnet 55 which causes the armature 57 to be attracted thereto. Accordingly, the armature 57 takes the lever 58 out of the supporting position, permitting the locking lever 61 to return into its initial position illustrated in FIGURE 8 against the force of its relay spring 62. The sector ring 8 can then change over into the open position and the actual exposing process now follows which progresses in the same manner as the previously described embodiment.

When necessary, the locking lever 61, after having been transferred into the locking position, can be transferred into its ineffective initial position by turning the winding ring 41 back whereby, the pawl 64 acts as a bypass countering the force of the spring 65 so that the support lever 58 can slide off the pawl 64 and resume the position shown in FIGURE 8.

It will be understood that the foregoing description with the details of exemplary structure is not to be construed in any way to limit the invention, but that modifications may be made thereto without departing from the scope of the invention as set forth in the following claims.

Having thus described our invention, we claim:

1. A photographic camera comprising a shutter having an electronically controlled timing device; a lock operably connected to said timing device and influenceable thereby for locking said shutter in the open position; an additional electronic circuit; and a second locking device operably connected to said shutter and to said additional electronic circuit, said second locking device being controlled by said additional electronic circuit for retarding the opening motion of said shutter upon the release thereof for a certain period of time and wherein said additional electronic circuit is a trip circuit connected in parallel to said electronic timing device, and said addition electronic circuit has an electromagnet controllable by said additional electronic circuit; and wherein said second locking device is operable by said electromagnet and has a locking lever engageable against the force of a spring with the shutter blade actuating member of said shutter, said locking lever being adapted to be locked in engagement with said shutter blade actuating member, and wherein after the elapse of the delay period, said second locking device is released by said electromagnet and said locking lever changes over into a position which allows the run-off of said shutter.

2. The photographic camera of claim 1, wherein two contact switches are provided for actuation when said locking lever transfers into the locking position, and wherein upon actuation of said switches, one of said switches activates said additional electronic circuit for the retardation of the opening motion of said shutter and the other of said switches deactivates said electronic timing device.

3. The photographic camera of claim 1 wherein said locking lever is of multi-armed design and cooperates with a spring loaded support lever operably connected to an armature of said electromagnet, said support lever being operative by said electromagnet to hold said locking lever after transfer of said locking lever into the locking position and to release said locking lever after the elapse of the delay period.

4. The photographic camera of claim 3 wherein said electromagnet is a holding magnet and an armature biased away from said magnet by a return spring which when energized holds said support lever in a position securing said locking lever in the locking position for the duration of the delay period.

5. The photographic camera of claim 3, wherein said electromagnet is a pulling magnet which is energized at the end of the delay period, and wherein said electromagnet when energized attracts said armature to move said support lever against the force of a positioning spring out of the position securing said locking lever in the locking position.

6. The photographic camera of claim 3, wherein said locking lever is connected to a winding ring equipped with a handle.

7. A photographic camera comprising shutter means; electronically controlled timing means controlling exposure times of said shutter means; locking means operable by said timing means to lock said shutter means in the open position; an additional electronic device on said camera; and a second locking device engageable with said shutter means, said second locking device being operable by said additional electronic device for retarding the opening motion of said shutter means for a certain time period upon the release of said shutter means and wherein said additional electronic device has circuit means connected in parallel to said timing means, and said additional electronic device has an electromagnet controllable by said circuit means; and wherein said second locking device is operable by said electromagnet and has a locking lever engageable against the force of a biasing member with the shutter blade actuating member of said shutter means, said locking lever being operable to be locked into engagement with said shutter blade actuating member, and wherein after the elapse of the delay period, said second locking device is released by said electromagnet and said locking lever changes over into a position which allows the runoff of said shutter means.

8. The photographic camera of claim 7, wherein two contact switches are provided operably connected to said second locking device for actuation when said second locking device transfers into the locking position, and wherein upon actuation of said switches by said second locking device one of said switches activates said additional electronic device for the retardation of the opening motion of said shuter means, and the other of said switches deactivates said electronic timing means controlling exposure times of said shutter means.

9. The photographic camera of claim 7 wherein said locking lever has a plurality of arms and cooperates with a biased support lever operably connected to an armature of said electromagnet, said support lever being operative by said electromagnet and said armature to hold said locking lever after transfer of said locking lever into the locking position and to release said locking lever after the elapse of the delay period.

10. The photographic camera of claim 9, wherein said electromagnet is a holding magnet and said armature is biased away from said magnet by a return spring and wherein said armature and said holding magnet when energized holds said support lever in a position securing said locking lever in the locking position for the duration of the delay period.

11. The photographic camera of claim 9 wherein said electromagnet is a pulling magnet which is energized at the end of the delay period, and wherein said electromagnet when energized attracts said armature to move said support lever against the force of a positioning spring out of the position securing said locking lever in the locking position.

12. The photographic camera of claim 9 wherein said locking lever is connected to a winding ring equipped with a handle for manual operation.

References Cited

UNITED STATES PATENTS

| | | | |
|---|---|---|---|
| 3,008,395 | 11/1961 | Tokutaro | 95—53.6 |
| 3,362,311 | 1/1968 | Singer | 95—53 |
| 3,386,363 | 6/1968 | Rentschler | 95—53 |

JOHN M. HORAN, Primary Examiner

L. H. McCORMICK, Jr., Assistant Examiner

U.S. Cl. X.R.

95—53, 63